United States Patent [19]
Onimaru et al.

[11] Patent Number: 6,074,325
[45] Date of Patent: Jun. 13, 2000

[54] SHIFT CONTROL UNIT OF AUTOMATIC TRANSMISSION

[75] Inventors: Yoshiyuki Onimaru; Masato Shimei, both of Nagoya; Takanao Suzuki, Hekinan; Yasuo Shirai, Toyota; Atuo Okumura, Toyota; Takahiro Sakai, Toyota, all of Japan

[73] Assignee: Aisin Seiki Kabushiki Kaisha, Kariya, Japan

[21] Appl. No.: 09/225,836

[22] Filed: Jan. 6, 1999

[30] Foreign Application Priority Data

Jan. 6, 1998 [JP] Japan ................................. 10-001154

[51] Int. Cl.$^7$ .................................................. F16H 61/06
[52] U.S. Cl. ............................................................ 477/154
[58] Field of Search ...................................... 477/154, 155

[56] References Cited

U.S. PATENT DOCUMENTS

| | | | |
|---|---|---|---|
| 5,443,595 | 8/1995 | Shimei et al. ............................ | 477/155 |
| 5,865,708 | 2/1999 | Nishio et al. ............................ | 477/155 |
| 5,879,268 | 3/1999 | Yasue et al. ............................ | 477/154 |
| 5,931,885 | 8/1999 | Kubo et al. ............................ | 477/156 |

FOREIGN PATENT DOCUMENTS 6-42622  2/1994  Japan .

*Primary Examiner*—Dirk Wright
*Attorney, Agent, or Firm*—Burns, Doane, Swecker & Mathis, LLP

[57] ABSTRACT

A shift control unit which improves the shift feeling of an automatic transmission includes an operation control device for placing a frictional engaging element in a slow drain state during a timing time decided by a timing time deciding device and in a quick drain state when the timing time has elapsed. The shift control unit is provided further with a computing device for computing the power-off engine speed necessary for outputting a small range upper limit value of a turbine torque from a number of revolutions of the turbine of the torque converter and from the performance characteristic of the torque converter, and an auxiliary operation control device for comparing the power-off engine speed and actual engine speed and for running the operation control device when the actual engine speed is equal to or greater than the power-off engine speed to place the frictional engaging element into the quick drain state immediately without running the operation control device when the actual engine speed is below the power-off engine speed.

1 Claim, 13 Drawing Sheets

Fig. 4

| MODE | | C0 | C1 | C2 | B0 | B1 | B2 |
|---|---|---|---|---|---|---|---|
| P | | ○ | | | | | |
| R | | ○ | | ○ | | | ○ |
| N | | ○ | | | | | |
| D | 1 | ○ | ○ | | | | |
| D | 2 | | ○ | | | ○ | |
| D | 3 | ○ | ○ | ○ | | | |
| D | 4 | | ○ | ○ | ○ | | |
| S | 1 | ○ | ○ | | | | |
| S | 2 | ○ | ○ | | | ○ | |
| S | 3 | ○ | ○ | ○ | | | |
| L | 1 | ○ | ○ | | | | ○ |
| L | 2 | ○ | ○ | | | ○ | |
| L | 3 | ○ | ○ | ○ | | | |

SHIFT CONTROL UNIT OF AUTOMATIC TRANSMISSION

This application corresponds to and claims priority under 35 U.S.C. § 119 with respect to Japanese Application No. 10(1998)-001154 filed on Jan. 6, 1998, the entire content of which is incorporated herein by reference.

FIELD OF THE INVENTION

The present invention generally relates to a vehicle transmission. More particularly, the present invention pertains to a shift control unit that is attached to an automatic transmission connected to an engine via a torque converter for controlling gear shift operations of the automatic transmission.

BACKGROUND OF THE INVENTION

A shift control unit of an automatic transmission is disclosed in JP-A-6-42622. The shift control unit proposed in this document functions to switch an engaging hydraulic pressure of a releasing side frictional engaging element from a slow drain state to a quick drain state at the time of up-shift attained by releasing one frictional engaging element and engaging another frictional engaging element based on the output of a shift signal. It also includes an engine torque detector for detecting engine torque, a timing time deciding device for deciding a timing time from the output of the shift signal to the start of the quick drain state non-stepwise when the shift signal is outputted based on the detected signal from the engine torque detector, and an operation controller for changing from the slow drain state during the timing time decided by the timing time deciding device to the quick drain state after the elapse of the timing time. This arrangement is intended to prevent an engine blow and a shift shock to allow the driver to obtain the optimum shift feeling by switching from the slow drain state to the quick drain state at the optimum change-over timing corresponding to the engine torque.

Because the slow drain state is switched to the quick drain-state at the optimum switching timing corresponding to the engine torque in the control unit described above, the state cannot be changed from the slow drain state to the quick drain state at the optimum switching timing when the engine torque itself changes or varies.

The engine torque obtained on the basis of the throttle opening angle and engine speed changes or varies to a not negligible degree due to individual variation in engine performance and its elapsed change, to the ON/OFF condition of the air-conditioner and to changes in use conditions such as those in running up/down a slope especially when the output of the engine is low as is well known in general. Accordingly, situations arise with the shift control unit described above in that it is unable to reliably prevent engine blow and shift shock when the change or the variation of the engine torque is great.

In light of the foregoing, a need exists for a shift control unit that is able to improve the shift feeling so that the slow drain state is changed to the quick drain state at the optimum switching timing even in a range in which the engine torque changes or varies to a not negligible degree.

SUMMARY OF THE INVENTION

The present invention provides a shift control unit having an improved shift feeling with the slow drain state being changed to the quick drain state at the optimum switching timing even in a range in which the engine torque changes or varies to a not negligible degree, with the state being changed from the slow drain state to the quick drain state corresponding auxiliarily to turbine torque which changes or varies less than the engine torque due to various conditions in the range in which the engine torque changes or varies to the degree not negligible (e.g., a range in which output torque of the engine is small) upon setting such that the state is changed from the slow drain state to the quick drain state at switching timing corresponding basically to the engine torque.

The present invention provides a shift control unit attached to an automatic transmission connected to an engine via a torque converter to switch engaging hydraulic pressure of a releasing side frictional engaging element from a slow drain state to a quick drain state at the time of up-shift attained by releasing one frictional engaging element and by engaging another frictional engaging element based on an output of a shift signal. The shift control includes an engine torque detector for detecting engine torque, a timing time deciding device that decides when the shift signal is outputted a timing time from the output of the shift signal to the start of the quick drain state in a non-stepwise manner based on a detection signal from the engine torque detector, and an operation controller for putting into the slow drain state during the timing time decided by the timing time deciding device and putting into the quick drain state when the timing time has elapsed. A computing device computes the power-off engine speed necessary for outputting a small range upper limit value of turbine torque based on the number of revolutions of the turbine of the torque converter found from the car speed and a shift gear ratio before up-shift and from the performance characteristic of the torque converter. An auxiliary operation controller compares the power-off engine speed computed by the computing device and the actual engine speed, and operates the operation controller when the actual engine speed is equal to or greater than the power-off engine speed and for putting into the quick drain state immediately without running the operation controller when the actual engine speed is below the power-off engine speed.

The shift control unit of the present invention allows the operation for switching from the slow drain state to the quick drain state at the optimum switching timing corresponding auxiliarily to the turbine torque which changes or varies less than the engine torque due to the various conditions in the range in which the engine torque changes or varies to a not negligible degree (e.g., a range in which the output torque of the engine is small) upon setting such that the slow drain state is changed to the quick drain state at the optimum switching timing corresponding basically to the engine torque, so that the element is switched from the slow drain state to the quick drain state at the optimum switching timing which causes less shift- shock even in the range in which engine torque changes or varies to the not negligible degree. Accordingly, the shift control unit of the present invention can reliably prevent shift shock and allow the driver to obtain the optimum shift feeling without being influenced by individual variations in engine performance and its elapsed change, by the ON/OFF state of the air-conditioner and by changes in use conditions such as those in running up/down a slope.

Further, because the same computing device and auxiliary operation controller used in the shift control unit of the present invention may be used even if the engine is changed to another type as long as the torque converter and the automatic transmission are the same, a period of time required to develop the shift control unit may be shortened.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG. 4 is a chart showing the relationship between the operative and non-operative states of the hydraulic clutches and hydraulic brakes shown in FIG. 1 in various operational states of the transmission;

DETAILED DESCRIPTION OF THE INVENTION

Figure 1:
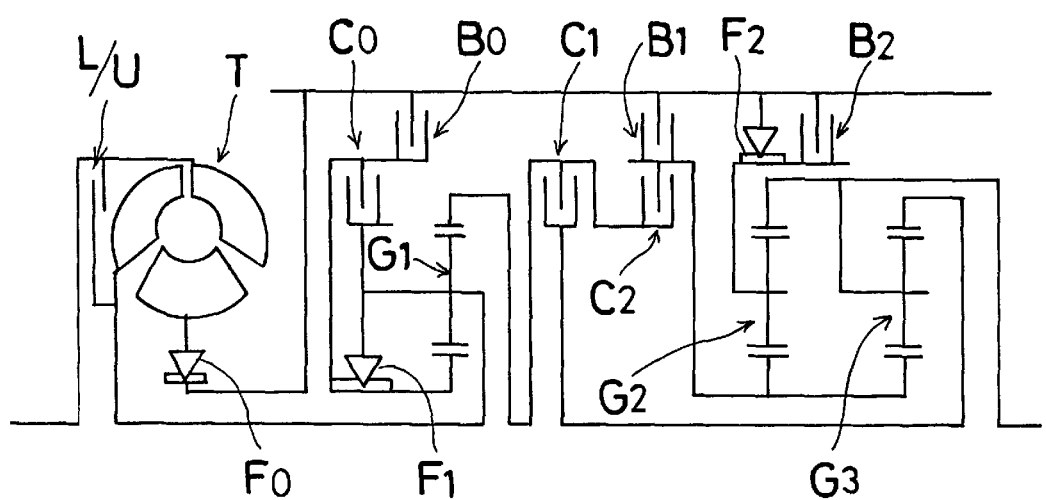
FIG. 1 is a schematic illustration of a gear train of a four-speed automatic transmission fitted with a vehicular lock-up mechanism.

An embodiment of the present invention will be described below with reference initially to FIG. 1 which schematically illustrates a gear train of a four-speed automatic transmission fitted with a vehicular lock-up mechanism. The gear train includes a torque converter T and planetary gear mechanisms G1, G2, G3. The gear train also includes, among other features, a lock-up hydraulic clutch L/U, gear-shifting hydraulic clutches C0, C1, C2, hydraulic brakes B0, B1, B2, one-way clutches F0, F1, F2.

Figure 2:
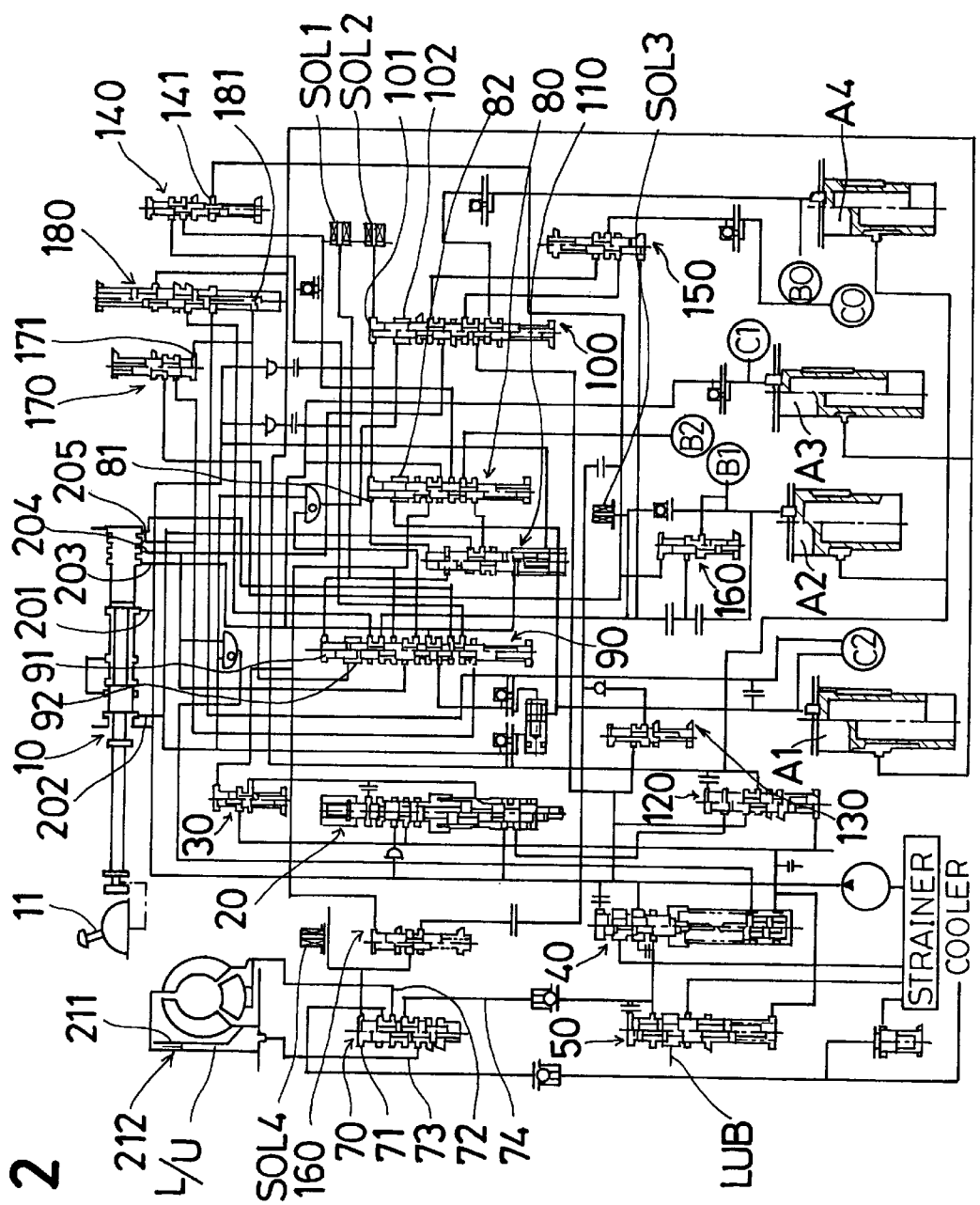
FIG. 2 is a hydraulic circuit diagram of a hydraulic control unit of the automatic transmission.

The hydraulic control unit for controlling the operative and non-operative states of the hydraulic clutches L/U, C0, C1, C2, the hydraulic brakes B0, B1, B2 and other features is illustrated in FIG. 2 and includes a manual valve 10 which operates corresponding to the shift control or shift position of a shift lever 11, a throttle valve 20 which operates corresponding to the degree of depression on the accelerator pedal (output of an engine), a cut-back valve 30 which operates corresponding to hydraulic pressure supplied to each pilot oil chamber, a primary regulator valve 40, a secondary regulator valve 50, a lock-up signal valve 60, and a lock-up control valve 70. The hydraulic control unit also includes a 1-2 shift valve 80, a 2-3 shift valve 90, a 3-4 shift valve 100, a Reverse control valve 110, an accumulator control valve 120, a modulator valve 130, a low coast modulator valve 140, a C0 exhaust valve 150, an orifice control valve 160, a low inhibit valve 170 and a 2-3 shift timing valve 180. The various valves operate corresponding to hydraulic pressure supplied to respective pilot hydraulic chambers, and accumulators A1–A4 as well as solenoid valves SOL1, SOL2, SOL3, SOL4 whose operations are controlled by an electronic control unit. The respective valves and accumulators described above are connected with the hydraulic clutches L/U, C0, C1, C2, the hydraulic brakes B0, B1, B2 and the other elements described above.

Figure 3:
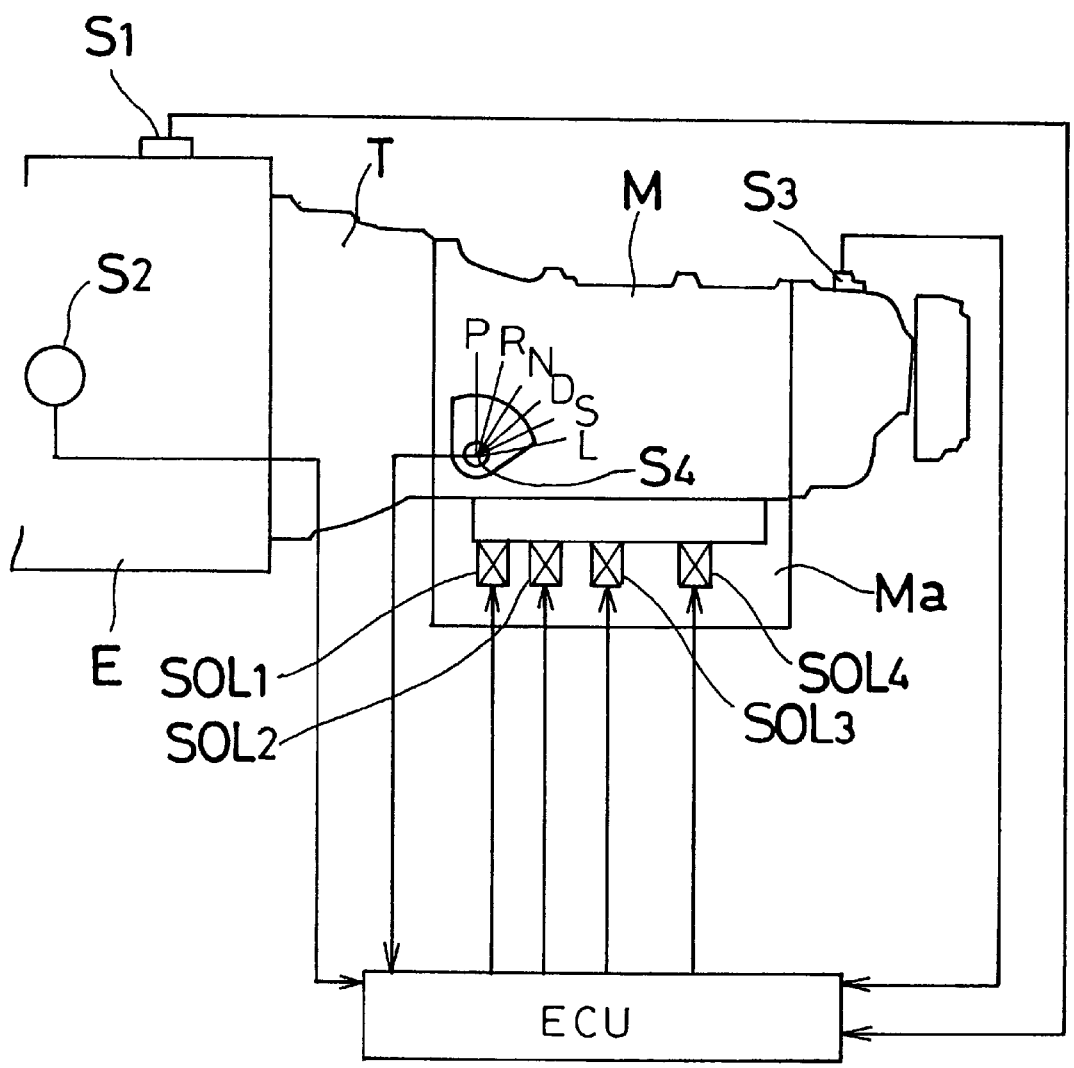
FIG. 3 is a system chart illustrating the control of the automatic transmission.

FIG. 3 schematically illustrates the control system for controlling the automatic transmission. An engine speed sensor S1 for detecting engine speed and a linear throttle sensor S2 for detecting the throttle opening angle are attached to the engine E. An output shaft speed sensor S3 for detecting car speed and a position sensor S4 for detecting respective shift positions (P, R, N, D, S and L) are attached to the automatic transmission M which is connected to the engine E via the torque converter T. The respective solenoid valves SOL1, SOL2, SOL3, SOL4 are attached to the hydraulic control unit Ma of the automatic transmission M. The electronic control unit ECU controls the operation of the respective solenoid valves SOL1, SOL2, SOL3 and SOL4 based on signals from the respective sensors S1–S4.

When the shift lever 11 is shifted to the P-position in the structure described above, the manual valve 10 is shifted to the P-range and the position sensor S4 detects the control of the shift lever 11 to the P-position. Then, the electronic control unit ECU turns on and closes the solenoid valves SOL1 and SOL2 and turns off and opens the solenoid valve SOL3. Thereby, a R-range circuit 202, a D-range circuit 203, a S-range circuit 204 and a L-range circuit 205 are disconnected from a line pressure supplying circuit 201 at the manual valve 10 and are connected to a reservoir. Accordingly, the hydraulic clutch C1 connected to the D-range circuit 203 is connected to the reservoir via the manual valve 10, the hydraulic clutch C2 is connected to the reservoir via the 2-3 shift valve 90 in the operative state (the state in which a spool is pressed against a spring) and the manual valve 10 or via the R-range circuit 202 and the manual valve 10, the hydraulic brake B0 is connected to the reservoir via the 3-4 shift valve 100 in the operative state, the hydraulic brake B1 is connected to the reservoir via the 2-3 shift valve 90 in the operative state, the 1-2 shift valve 80 in the operative state, the D-range circuit 203 and the manual valve 10, and the hydraulic brake B2 is connected to the reservoir via the 1-2 shift valve 80 in the operative state and the Reverse control valve 110 in the operative state. The line pressure supplying circuit 201 connected to the 3-4 shift valve 100 is also connected to the hydraulic clutch C0 via the 3-4 shift valve 100 in the operative state and the C0 exhaust valve 150 in the non-operative state by hydraulic pressure applied to an upper pilot hydraulic chamber 101, thus forming a P-range circuit. Then, the operative and non-operative states of the hydraulic clutches C0, C1, C2, the hydraulic brakes B0, B1, B2 turn out as shown in the P-mode in FIG. 4, with the mark 0 indicating that they are in the operative state and no mark indicating that they are in the non-operative state, and the gear train shown in FIG. 1 is put into the neutral state.

When the shift lever 11 is shifted to the R-position, the manual valve 10 is shifted to the R-range and the position sensor S4 detects the control of the shift lever 11 to the R-position. Then, the electronic control unit ECU turns on and closes the solenoid valve SOL2 and turns off and opens the solenoid valves SOL1 and SOL3. The line pressure supplying circuit 201 is thus connected with the R-range circuit 202 at the manual valve 10. Also, the D-range circuit 203, the S-range circuit 204 and the L-range circuit 205 are disconnected from the line pressure supplying circuit 201 and are connected to the reservoir. Accordingly, the hydraulic clutch C1 and the hydraulic brake B0 are connected to the reservoir similarly to the P-range circuit described above and the hydraulic brake B1 is connected to the reservoir via the 2-3 shift valve 90 and the 2-3 shift timing valve 180 in the non-operative state. The line pressure supplying circuit 201 connected to the manual valve 10 is connected to the hydraulic brake B2.via the R-range circuit 202, the Reverse control valve 110 in the non-operative state and the 1-2 shift valve 80 in the operative state and is connected, at the same time, with the hydraulic clutch C2 via the R-range circuit 202. The line pressure supplying circuit 201 connected with the 3-4 shift valve 100 is connected with the hydraulic clutch C0 via the 3-4 shift valve 100 in the operative state and the C0 exhaust valve 150 in the non-operative state, thus forming an R-range circuit. Then, the operative and non-operative states of the hydraulic clutches C0, C1, C2 and the hydraulic brakes B0, B1, B2 turn out as shown in the R-mode in FIG. 4 and the Reverse gear train is completed by the gear train shown in FIG. 1.

When the shift lever 11 is shifted to the N-position, the manual valve 10 is shifted to the N-range and the position sensor S4 detects the control of the shift lever 11 to the N-position. The electronic control unit ECU turns on and closes the solenoid valves SOL1 and SOL2 and turns off and opens the solenoid valve SOL3. The R-range circuit 202, the D-range Circuit 203, the S-range circuit 204 and the L-range circuit 205 are thus disconnected from the line pressure supplying circuit 201 at the manual valve 10 and are connected to the reservoir in a manner similar to the P-range circuit described above. Accordingly, the hydraulic clutches C1, C2 and the hydraulic brakes B0, B1, B2 are connected to the reservoir in a manner similar to the P-range circuit described above and the line pressure supplying circuit 201 connected to the 3-4 shift valve 100 is connected to the hydraulic clutch C0 via the 3-4 shift valve 100 in the operative state and the C0 exhaust valve 150 in the non-operative state, thus forming an N-range circuit. Then, the operative and non-operative states of the hydraulic clutches C0, C1, C2, the hydraulic brakes B0, B1, B2 are as shown in the N-mode in FIG. 4 and the gear train shown in FIG. 1 is put into the Neutral state.

When the shift lever 11 is shifted to the D-position, the manual valve 10 is shifted to the D-range and the position sensor S4 detects the control of the shift lever 11 to the D-position. Then, the electronic control unit ECU controls the ON/OFF state of the solenoid valves SOL1–SOL3 as explained below in (D1), (D2), (D3) and (D4) corresponding to the car speed (obtained by a signal from the output shaft speed sensor S3) and the throttle opening angle (obtained by a signal from the linear throttle sensor S2). The line pressure supplying circuit 201 is then connected with the D-range circuit 203 at the manual valve 10 and the R-range circuit 202, the S-range circuit 204 and the L-range circuit 205 are disconnected from the line pressure supplying circuit 201 at the manual valve 10 and are connected to the reservoir.

(D1) When the Electronic Control Unit ECU Determines Operation to be in the First Speed Operating Range In this case, the electronic control unit ECU turns on and closes the solenoid valve SOL1 and turns off and opens the solenoid valves SOL2 and SOL3. The 2-3 shift valve 90 is thus put into the operative state by receiving pilot pressure at the upper pilot oil chamber 91 and the 3-4 shift valve 100 is put into the operative state by receiving line pressure of the line pressure supplying circuit 201 at the lower pilot oil chamber 102 via the D-range circuit 203 and the 2-3 shift valve 90 in the operative state. Accordingly, the hydraulic clutch C2 is connected to the reservoir via the 2-3 shift valve 90 in the operative state and the manual valve 10 or the R-range circuit 202 and the manual valve 10, the hydraulic brake B1 is connected to the reservoir via the 2-3 shift valve 90 in the operative state and the 1-2 shift valve 80 in the non-operative state, and the hydraulic brake B2 is connected to the reservoir via the 1-2 shift valve 80 in the non-operative state, the 2-3 shift valve 90 in the operative state, the L-range circuit 205 and the manual valve 10. The line pressure supplying circuit 201 connected to the 3-4 shift valve 100 is connected to the hydraulic clutch C0 via the 3-4 shift valve 100 in the operative state and the C0 exhaust valve 150 in the non-operative state, and the hydraulic clutch C1 connected with the D-range circuit 203 is connected with the line pressure supplying circuit 201 via the manual valve 10, thus forming a D–1 range circuit. Then, the operative and non-operative states of the hydraulic clutches C0, C1, C2 and the hydraulic brakes B0, B1, B2 are as shown in the D–1 mode in FIG. 4 and the gear train of the first speed shift stage is completed in the gear train shown in FIG. 1.

(D2) When the Electronic Control Unit ECU Determines Operation to be in the Second Speed Operating Range In this situation, the electronic control unit ECU turns on and closes the solenoid valves SOL1, SOL2 and turns off and opens the solenoid valve SOL3. Pilot pressure is thus applied to respective pilot oil chambers 81, 91, 101 of the 1-2 shift valve 80, the 2-3 shift valve 90 and the 3-4 shift valve 100 to place the 1-2 shift valve 80, the 2-3 shift valve 90 and the 3-4 shift valve 100 in the operative state. Accordingly, the hydraulic clutch C1 connected to the D-range circuit 203 is connected with the line pressure supplying circuit 201 via the manual valve 10, the hydraulic brake B1 is connected to the line pressure supplying circuit 201 via the 2-3 shift valve 90 in the operative state, the 1-2 shift valve 80 in the operative state, the D-range circuit 203 and the manual valve 10, the hydraulic clutch C0 is connected to the reservoir via the C0 exhaust valve 150 which has been put into the operative state by the pressure oil supplied to the hydraulic brake B1, the 3-4 shift valve 100 in the operative state, the S-range circuit 204 and the manual valve 10, the hydraulic clutch C2 is connected to the reservoir via the 2-3 shift valve 90 in the operative state and the manual valve 10 or the R-range circuit 202 and the manual valve 10, the hydraulic brake B0 is connected to the reservoir via the 3-4 shift valve 100 in the operative state, and the hydraulic brake B2 is connected to the reservoir via the 1-2 shift valve 80 in the operative state, the Reverse control valve 110 whose spool is pressed upward as seen with reference to FIG. 2 by receiving hydraulic pressure from both of the line pressure supplying circuit 201 and the D-range circuit 203 in the same direction with the operating direction of the spring, the R-range circuit 202 and the manual valve 10. This thus forms a D–2 range circuit. The operative and non-operative states of the hydraulic clutches C0, C1, C2 and the hydraulic brakes B0, B1, B2 are as shown in the D–2 mode in FIG. 4, with the gear train of the second speed shift stage being completed in the gear train shown in FIG. 1.

(D3) When the Electronic Control Unit ECU Determines Operation to be in the Third Speed Operating Range In this case, the electronic control unit ECU turns on and closes the solenoid valve SOL2 and turns off and opens the solenoid valves SOL1, SOL3. As a result, pilot pressure is applied to the respective pilot oil chambers 81, 101 of the 1-2 shift valve 80 and the 3-4 shift valve 100 to place both the 1-2 shift valve 80 and the 3-4 shift valve 100 into the operative state. Also, pilot pressure is removed from the pilot oil chamber 91 of the 2-3 shift valve 90 to put the 2-3 shift valve 90 into the non-operative state. Accordingly, the hydraulic brake B0 is connected to the reservoir via the 3-4 shift valve 100 in the operative state, the hydraulic brake B1 is connected to the reservoir via the 2-3 shift valve 90 in the non-operative state and the 2-3 shift timing valve 180, and the hydraulic brake 82 is connected to the reservoir via the 1-2 shift valve 80 in the operative state, the Reverse control valve 110 whose spool is pressed upward as seen with reference to FIG. 2 by receiving hydraulic pressure from both the line pressure supplying circuit 201 and the D-range circuit 203 in the same direction with the operating direction of the spring, the R-range circuit 202 and the manual valve 10. In addition, the hydraulic clutch C1 connected to the D-range circuit 203 is connected to the line pressure supplying circuit 201 via the manual valve 10, and the hydraulic clutch C0 is connected to the line pressure supplying circuit 201 connected to the 3-4 shift valve 100 via the C0 exhaust valve 150 in the non-operative state and the 3-4 shift valve 100 in the operative state. Thus, a D–3 range circuit is formed. Then, the operative and non-operative states of the hydraulic clutches C0, C1, C2 and the hydraulic brakes B0, B1, B2 are as shown in the D–3 mode in FIG. 4 and the gear train of the third speed shift stage is completed in the gear train shown in FIG. 1.

(D4) When the Electronic Control Unit ECU Determines Operation to be in the Fourth Speed Operating Range In this situation, the electronic control unit ECU turns on and closes the solenoid valve SOL3 and turns off and opens the solenoid valves SOL1, SOL2. The 2-3 shift valve 90 and the 3-4 shift valve 100 are both put into the non-operative state and pilot pressure is applied to the respective pilot oil chambers 141, 161, 171, 181 of the low coast modulator valve 140, the orifice control valve 160, the low inhibit valve 170 and the 2-3 shift timing valve 180. Pilot pressure is applied also to the pilot oil chamber 82 of the 1-2 shift valve 80 via the D-range circuit 203 and the 2-3 shift valve 90 in the non-operative state. Accordingly, the hydraulic brake B1 is connected to the reservoir via the 2-3 shift valve 90 in the non-operative state and the 2-3 shift timing valve 180, and the hydraulic brake B2 is connected to the reservoir via the 1-2 shift valve 80 in the operative state, the Reverse control valve 110 in the non-operative state, the R-range circuit 202 and the manual valve 10. In addition, the hydraulic clutch C0 is connected to the reservoir via the C0 exhaust valve 150 in the non-operative state and the 3-4 shift valve 100 in the operative state, the hydraulic clutch C1 connected to the D–1 range circuit 203 is connected to the line pressure supplying circuit 201 via the manual valve 10, the hydraulic clutch C2 is connected to the line pressure supplying circuit 201 via the 2-3 shift valve 90 in the non-operative state, the D–1 range circuit 203 and the manual valve 10, and the hydraulic brake B0 is connected to the line pressure supplying circuit 201 connected to the 3-4 shift valve 100 via the 3-4 shift valve 100 in the non-operative state. This thus forms the D–4 range circuit. The operative and non-operative states of the hydraulic clutches C0, C1, C2 and the hydraulic brakes B0, B1, B2 are as shown in the D–1 mode in FIG. 4, and a gear train of the fourth speed shift stage is completed in the gear train shown in FIG. 1.

When the car speed becomes equal to or greater than a preset car speed at this time (running with the gear train in the fourth speed shift stage), the electronic control unit ECU determines that the speed has entered a fourth speed lock-up operating range and turns on and closes the solenoid valve SOL4. Thereby, the hydraulic pressure regulated by the modulator valve 130 is applied from the line pressure supplying circuit 201 to a pilot oil chamber 71 of the lock-up control valve 70 via the lock-up signal valve 60 in the operative state. Accordingly, the lock-up control valve 70 is put into the operative state, pressure supplied from the secondary regulator valve 50 is supplied to the torque converter T via passages 74, 72, and a passage 73 is connected to the reservoir. Therefore, a lock-up piston 211 is pressed against a front cover 212 within the torque converter T by the differential pressure before and after thereof and the lock-up hydraulic clutch L/U is put into a directly coupled state.

When the car speed becomes less than the preset car speed, the electronic control unit ECU determines that the speed has returned to the fourth speed operating range and turns off and opens the solenoid valve SOL4. Then, the lock-up control valve 70 is put into the non-operative state, hydraulic pressure is supplied to the front of the lock-up piston 211 via the passage 73, operating oil is discharged from the back of the lock-up piston 211 to an oil cooler via the passage 72, the lock-up piston 211 is pressed backward and then the directly coupled state of the hydraulic clutch L/U is released.

When the shift lever 11 is shifted to the S-position, the manual valve 10 is shifted to the S-range and the position sensor S4 detects the control of the shift lever 11 to the S-position. Then, the electronic control unit ECU controls the ON/OFF of the solenoid valves SOL1–SOL3 as described below in (S1), (S2), (S3) corresponding to the car speed and the throttle opening angle. Then, the line pressure supplying circuit 201 is connected with the D-range circuit 203 and the S-range circuit 204 by the manual valve 10. The R-range circuit 202 and the L-range circuit 205 are disconnected from the line pressure supplying circuit 201 and are connected to the reservoir.

(S1) When the Electronic Control Unit ECU Determines Operation to be in the First Speed Operating Range In this case, the electronic control unit ECU turns on and closes the solenoid valve SOL1 and turns off and opens the solenoid valves SOL2, SOL3. The 2-3 shift valve 90 and the 3-4 shift valve 100 are thus put into the operative state in a manner similar to the (D1) situation described above. Further, the hydraulic clutch C2 and the hydraulic brakes B0, B1, B2 are connected to the reservoir, and the hydraulic clutches C0, C1 are connected to the line pressure supplying circuit 201. This thus forms the S–1 range circuit which is similar to the (D1) case described above. The operative and non-operative states of the hydraulic clutches C0, C1, C2 and the hydraulic brakes B0, B1, B2 are as shown in the S–1 mode in FIG. 4, and the gear train of the first speed shift stage is completed in the gear train shown in FIG. 1.

(S2) When the Electronic Control Unit ECU Determines Operation to be in the Second Speed Operating Range In this situation, the electronic control unit ECU turns on and closes the solenoid valves SOL1, SOL2 and turns off and opens the solenoid valve SOL3. The 1-2 shift valve 80, the 2-3 shift valve 90 and the 3-4 shift valve 100 are thus placed in the operative state in a manner similar to the (D2) case described above. Accordingly, the hydraulic clutch C1 and the hydraulic brake B1 are connected to the line pressure supplying circuit 201, the hydraulic clutch C0 is connected to the line pressure supplying circuit 201 via the C0 exhaust valve 150 which has been put into the operative state by the oil pressure supplied to the hydraulic brake B1, the 3-4 shift valve 100 in the operative state, the S-range circuit 204 and the manual valve 10 in a manner similar to the (D2) situation described above. Further, the hydraulic clutch C2 and the hydraulic brakes B0, B2 are connected to the reservoir, thus forming the S–2 range circuit similar to that in the (D2) situation described above. The operative and non-operative states of the hydraulic clutches C0, C1, C2 and the hydraulic brakes B0, B1, B2 are as shown in the S–2 mode in FIG. 4 and the gear train of the second speed shift stage is completed in the gear train shown in FIG. 1. Because the hydraulic clutch C0 is operative in this case, idle running of the one-way clutch F1 is capable of being suppressed and the engine brake becomes effective, thus differing from the case of (D2) described above.

(S3) When the Electronic Control Unit ECU Determines Operation to be the Third Speed Operating Range In this situation, the electronic control unit ECU turns on and closes the solenoid valve SOL2 and turns off and opens the solenoid valves SOL1, SOL3. The 1-2 shift valve 80 and the 3-4 shift valve 100 are thus put into the operative state and the 2-3 shift valve 90 is put into the non-operative state similar to the (D3) case described above. Further, the hydraulic brakes B0, B1, B2 are connected to the reservoir and the hydraulic clutches C0, C1, C2 are connected to the line pressure supplying circuit 201, thus forming the S–3 range circuit, similar to the (D3) case described above. Then, the operative and non-operative states of the hydraulic clutches C0, C1, C2 and the hydraulic brakes B0, B1, B2 are as shown in the S–3 mode in FIG. 4 and the gear train of the third speed shift stage is completed in the gear train shown in FIG. 1.

When the shift lever 11 is shifted to the L-position, the manual valve 10 is shifted to the L-range and the position sensor S4 detects the control of the shift lever 11 to the L-position. Then, the electronic control unit ECU controls ON/OFF of the solenoid valves SOL1–SOL3, as described below in (L1), (L2) and (L3), corresponding to or based on the car speed and the throttle opening angle. Then, the line pressure supplying circuit 201 is connected with the D-range circuit 203, the S-range circuit-204 and the L-range circuit 205 by the manual valve 10. The R-range circuit 202 is disconnected from the line pressure supplying circuit 201 and is connected to the reservoir.

(L1) When the Electronic Control Unit ECU Determines Operation to be in the First Speed Operating Range In this case, the electronic control unit ECU turns on and closes the solenoid valve SOL1 and turns off and opens the solenoid valves SOL2, SOL3. The 2-3 shift valve 90 and the 3-4 shift valve 100 are put into the operative state similar to the (D1) and (S1) situations described above, and pilot pressure is applied to the lower pilot oil chamber 92 of the 2-3 shift valve 90 from the L-range circuit 205 via the low inhibit valve 170 in the non-operative state, thus putting the 2-3 shift valve 90 again into the operative state. Accordingly, the hydraulic clutch C2 and the hydraulic brakes B0, B1 are connected to the reservoir, and the hydraulic clutches C0, C1 are connected to the line pressure supplying circuit 201. Also, the hydraulic brake B2 is connected to the line pressure supplying circuit 201 via the 1-2 shift valve 80 in the non-operative state, the low coast modulator valve 140, the 2-3 shift valve 90 in the operative state, the L-range circuit 205 and the manual valve 10, thus forming the L–1 range circuit similar to in the (D1) and (S1) cases described above. Then, the operative and non-operative states of the hydraulic clutches C0, C1, C2 and the hydraulic brakes B0, B1, B2 are as shown in the L–1 mode in FIG. 4 and the gear train of the first speed shift stage is completed in the gear train shown in FIG. 1. Because the hydraulic brake B2 is operative in this case, it is possible to suppress the idle running of the one-way clutch F2 and the engine brake becomes effective, thus differing from the (D1) and (S1) situations described above.

(L2) When the Electronic Control Unit ECU Determines Operation to be in the Second Speed Operating Range In this case, the electronic control unit ECU turns on and closes the solenoid valves SOL1, SOL2 and turns off and opens the solenoid valve SOL3. Thereby, the 1-2 shift valve 80, the 2-3 shift valve 90 and the 3-4 shift valve 100 are put into the operative state similar to the (D2) and (S2) cases described above. Pilot pressure is thus applied to the lower pilot oil chamber 92 of the 2-3 shift valve 90 from the L-range circuit 205 via the low inhibit valve 170 in the non-operative state, thus putting the 2-3 shift valve 90 again into the operative state. Accordingly, the hydraulic clutch C1 and the hydraulic brake B1 are connected to the line pressure supplying circuit 201 similar to the (D2) and (S2) cases described above. Further, the hydraulic clutch C0 is connected to the line pressure supplying circuit 201 via the C0 exhaust valve 150, which has been put into the operative state by the oil pressure supplied to the hydraulic brake B1, the 3-4 shift valve 100 in the operative state, the S-range circuit 204 and the manual valve 10 similar to the (S2) case described above. Further, the hydraulic clutch C2 and the hydraulic brakes B0, B2 are connected to the reservoir, thus forming the L–2 range circuit, similar to the (D2) and (S2) situations described above. The operative and non-operative states of the hydraulic clutches C0, C1, C2 and the hydraulic brakes B0, B1, B2 are as shown in the L–2 mode in FIG. 4 and the gear train of the second speed shift stage which is similar to the (S2) case described above is completed in the gear train shown in FIG. 1.

(L3) When the Electronic Control Unit ECU Determines Operation to be in the Third Speed Operating Range In this case, the electronic control unit ECU turns on and closes the solenoid valves SOL2, SOL3 and turns off and opens the solenoid valve SOL1. Pilot pressure is thus applied to the respective pilot oil chambers 81, 101 of the 1-2 shift valve 80 and the 3-4 shift valve 100, thus putting both the 1-2 shift valve 80 and the 3-4 shift valve 100 in the operative state. Further, pilot pressure is applied to the respective pilot oil chambers 141, 161, 171, 181 of the low coast modulator valve 140, the orifice control valve 160, the low inhibit valve 170 and the 2-3 shift timing valve 180 to put the low inhibit valve 170 into the operative state and the lower pilot oil chamber 92 of the 2-3 shift valve 90 is connected to the reservoir via the low inhibit valve 170 in the operative state to put the 2-3 shift valve 90 in the non-operative state. Accordingly, the hydraulic brakes B0, B1, B2 are connected to the reservoir and the hydraulic clutches C0, C1, C2 are connected to the line pressure supplying circuit 201, thus forming the L–3 range circuit, similar to the (D3) and (S3) cases described above. The operative and non-operative states of the hydraulic clutches C0, C1, C2 and the hydraulic brakes B0, B1, B2 are thus as shown in the L–3 mode in FIG. 4, and the gear train of the third speed shift stage is completed in the gear train shown in FIG. 1.

Figure 5:
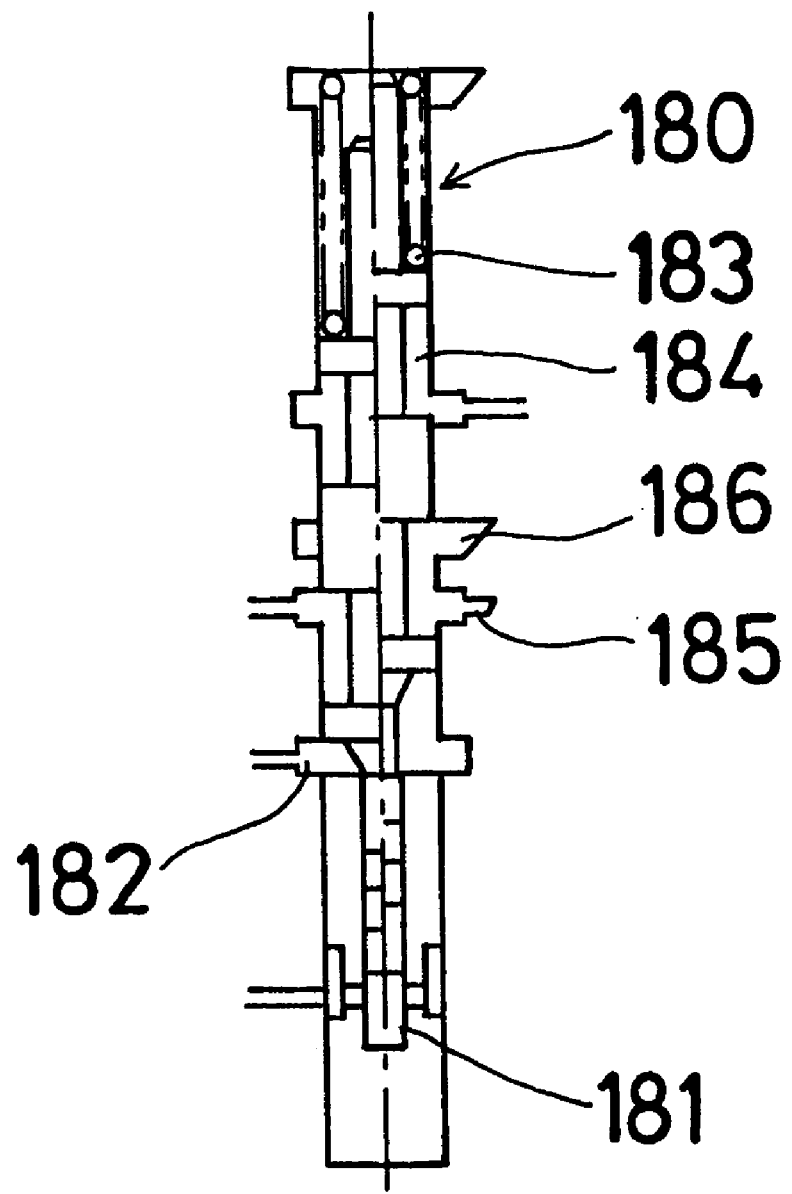
FIG. 5 is an enlarged view of a 2-3 shift timing valve.
Figure 6:
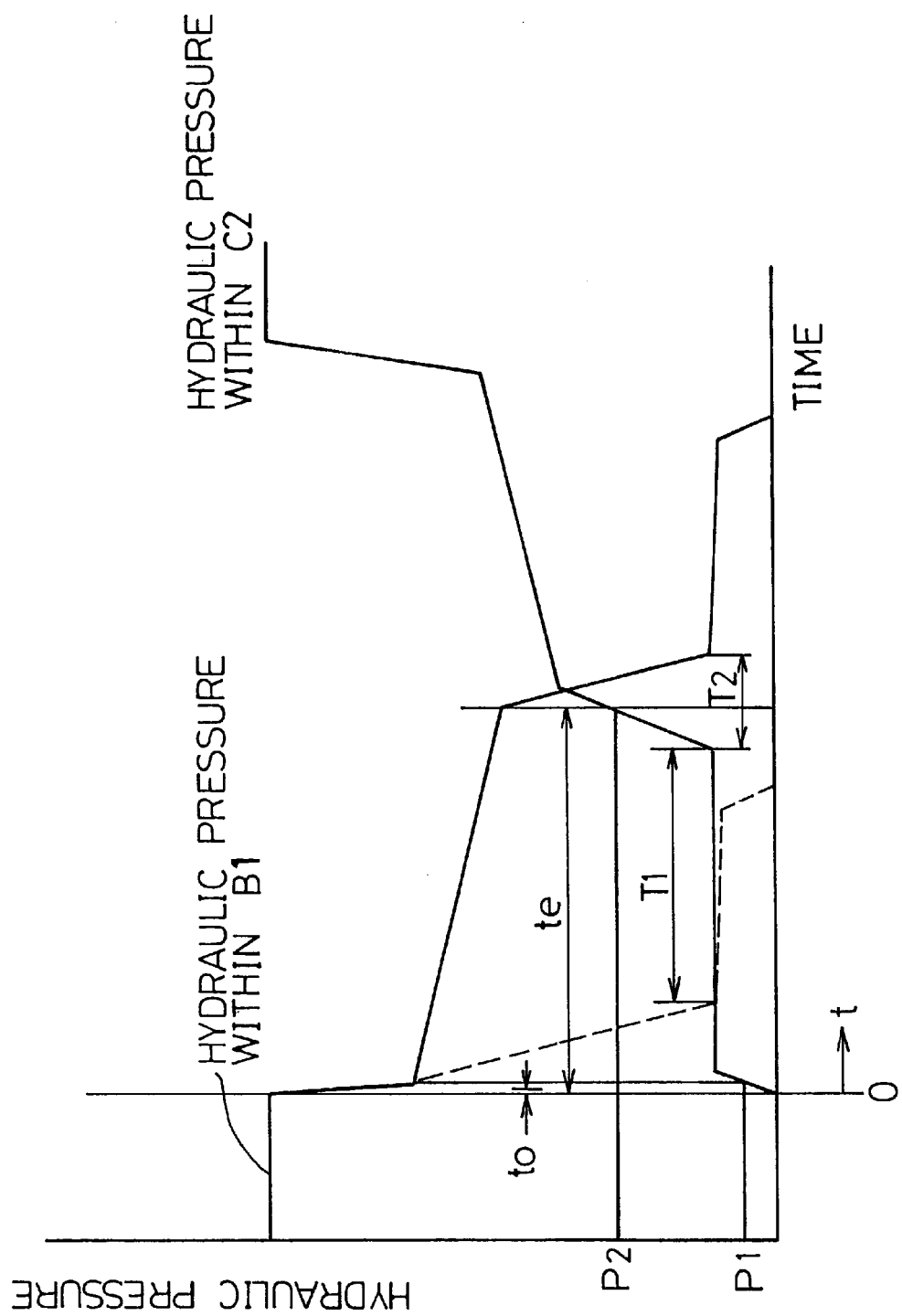
FIG. 6 is a graph illustrating changes in hydraulic pressure within the hydraulic brake B1 and changes in hydraulic pressure within the hydraulic clutch C2 in shifting up from Second to Third.
Figure 7:
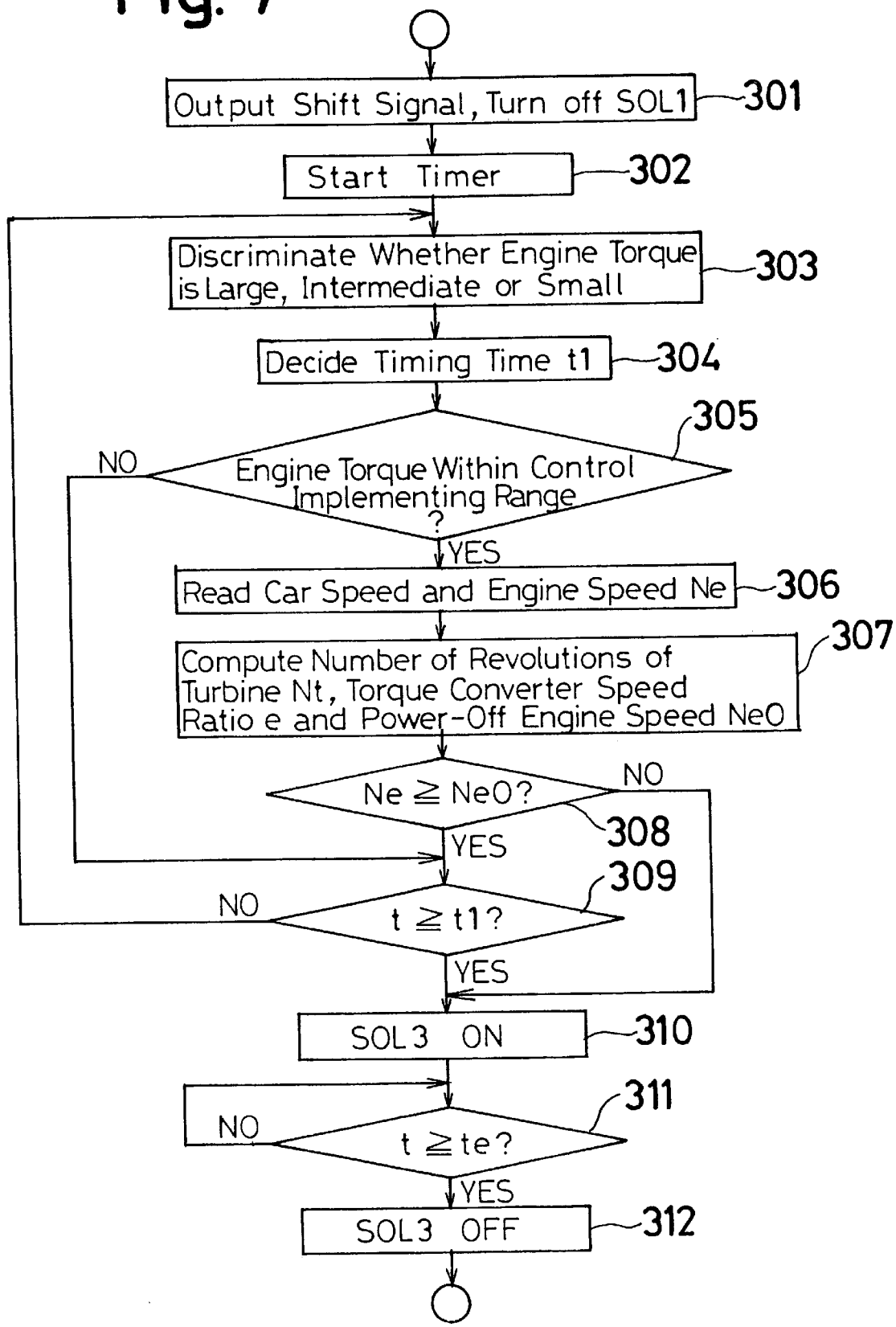
FIG. 7 is a flowchart showing a part of a program executed by the electronic control unit shown in FIG. 3.

According to the present embodiment and as seen with reference to FIG. 5, the timing for switching from the non-operative state (the slow drain state shown in the left half part of FIG. 5) to the operative state (the quick drain state shown in the right half part of FIG. 5) of the 2-3 shift timing valve 180 is controlled based on or corresponding basically to the engine torque non-stepwise and corresponding auxiliarily to the turbine torque which changes or varies less than the engine torque due to various conditions, and the falling characteristic of hydraulic pressure within the hydraulic brake B1 is controlled non-stepwise within a range from a characteristic curve represented by the broken line to a characteristic curve represented by the solid line as shown in FIG. 6 by executing a program which is stored in the electronic control unit ECU in advance and corresponds to the flowchart in FIG. 7 in switching the shift from the D–2 mode or the S–2 mode to the D–3 mode or the S–3 mode in FIG. 4 (in shifting up from the second speed to the third speed).

The characteristic curve of the hydraulic pressure within the hydraulic brake B1 represented by the broken line in FIG. 6 shows the situation when the solenoid valve SOL3 is turned on to apply pilot pressure to the pilot oil chamber 181 almost at the same time when a shift signal is outputted in shifting up from the second speed to the third speed and the solenoid valve SOL1 is turned off. In this case, when the hydraulic pressure within the hydraulic clutch C2 which rises as shown in FIG. 6 as the operation of the 2-3 shift valve 90 is switched from the operative state to the non-operative state by turning off the solenoid valve SOL1, resultant of the force caused by the hydraulic pressure within the hydraulic clutch C2 introduced to the pilot oil chamber 182 of the 2-3 shift timing valve 180 and the force caused by the pilot hydraulic pressure applied to the pilot oil chamber 181 by the operation of the solenoid valve SOL3 becomes equal to or greater than resultant of the force caused by the return spring 183 of the 2-3 shift timing valve 180 and the force caused by pilot hydraulic pressure applied to the pilot oil chamber 184, i.e., the back pressure of the accumulator governed on the basis of the throttle pressure from the throttle valve 20. Then, the 2-3 shift timing valve 180 is switched from the non-operative state to the operative state such that the state thereof is switched from the slow drain state in which the hydraulic pressure within the hydraulic brake B1 flows to the reservoir through the discharge passage 185 of the 2-3 shift timing valve 180 having a throttle to the quick drain state in which the hydraulic pressure flows to the reservoir through the discharge passage 185 having the throttle and a discharge passage 186 having no throttle. An underlap time from the non-engaged state of the hydraulic brake B1 to the start of the engagement of the hydraulic clutch C2 is represented by T1.

Meanwhile, the characteristic curve of the hydraulic pressure within the hydraulic brake B1 represented by the solid line in FIG. 6 shows the situation when the solenoid valve SOL3 is not actuated and no pilot pressure is applied to the pilot oil chamber 181 in shifting up from the second speed to the third speed. In this case, the force caused by the hydraulic pressure within the hydraulic clutch C2 introduced to the pilot oil chamber 182 of the 2-3 shift timing valve 180 when the hydraulic pressure within the hydraulic clutch C2 which rises as shown in FIG. 6 as the operation of the 2-3 shift valve 90 is switched from the operative state to the non-operative state becomes equal to or greater than the resultant of the force caused by the return spring 183 of the 2-3 shift timing valve 180 and the force caused by the pilot hydraulic pressure applied to the pilot oil chamber 184. The 2-3 shift timing valve 180 is switched from the non-operative state to the operative state such that the state of the 2-3 shift timing valve 180 is switched from the slow drain state to the quick drain state. An underlap time from the start of engagement of the hydraulic clutch C2 to the non-engagement of the hydraulic brake B1 is represented by T2 in FIG. 6.

The operation for controlling the switching timing of the 2-3 shift timing valve 180 based on or corresponding basically to the engine torque non-stepwise and corresponding auxiliarily to the turbine torque can be understood with reference to the characteristic curves in FIG. 6 and the flowchart in FIG. 7. When the electronic control unit ECU detects that the range has been changed from the second speed operating range to the third speed operating range based on the throttle opening angle obtained from the signal from the linear throttle sensor S2 and the car speed obtained from the signal from the output shaft speed sensor S3 with reference to a shift map that is stored in the electronic control unit ECU in advance, the electronic control unit ECU outputs a shift signal to turn off the solenoid valve SOL1 in Step 301. In Step 302, a timer within the electronic control unit ECU is started to start to count an elapsed time t. In step 303, the electronic control unit ECU discriminates or determines whether the engine torque is large, intermediate or small based on the engine speed obtained from the signal from the engine speed sensor S1 and the throttle opening angle obtained from the signal from the linear throttle sensor S2 with reference to an engine torque map in FIG. 8 stored in the electronic control unit ECU in advance. A timing time t1 is then decided in Step 304 from the determination result in Step 303 and the throttle opening angle obtained from the signal from the linear throttle sensor S2 with reference to the timing time map in FIG. 9 stored in the electronic control unit ECU in advance.

Figure 8:
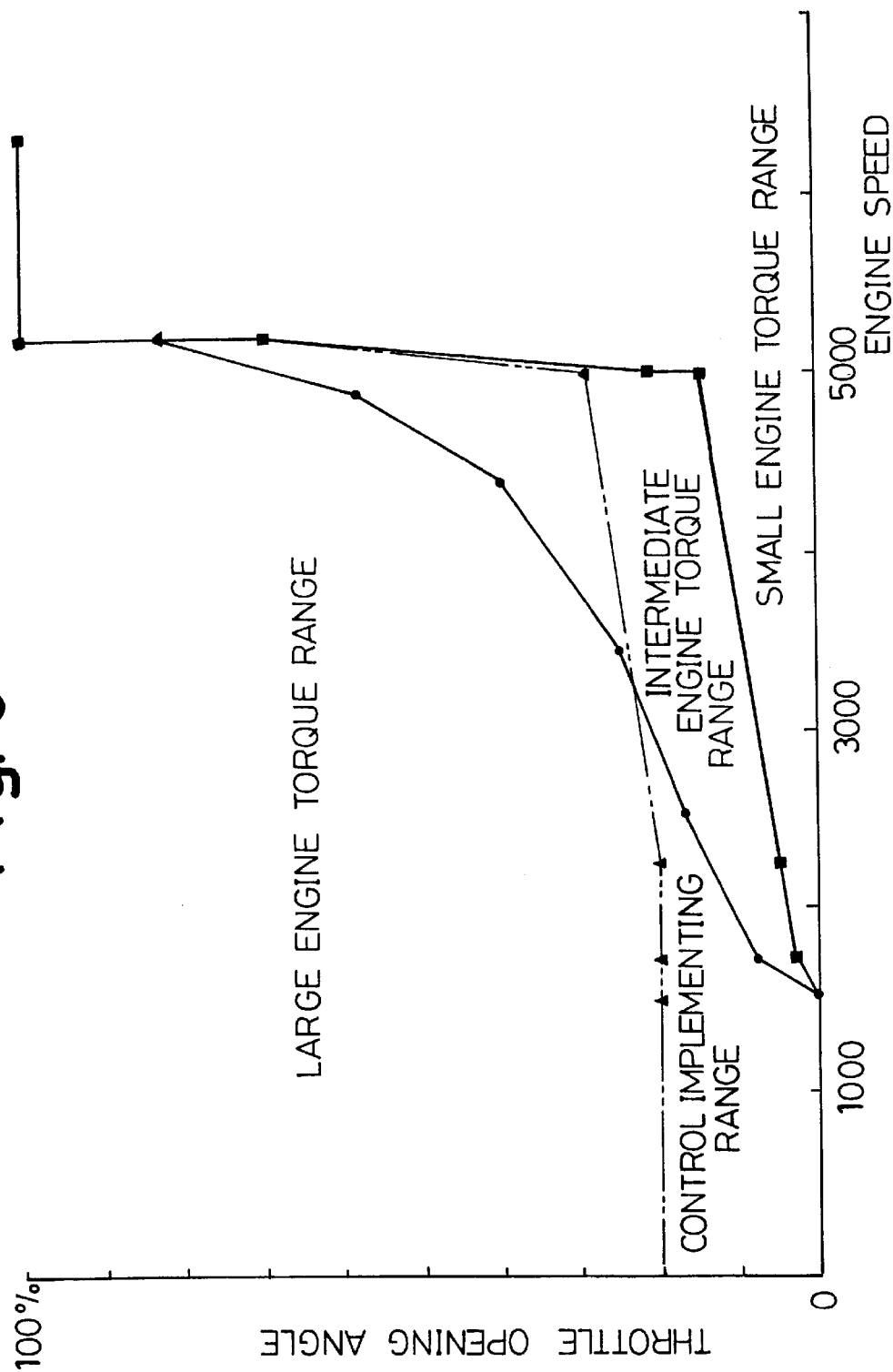
FIG. 8 is a graph showing an engine torque map example stored in the electronic control unit shown in FIG. 3.
Figure 10:
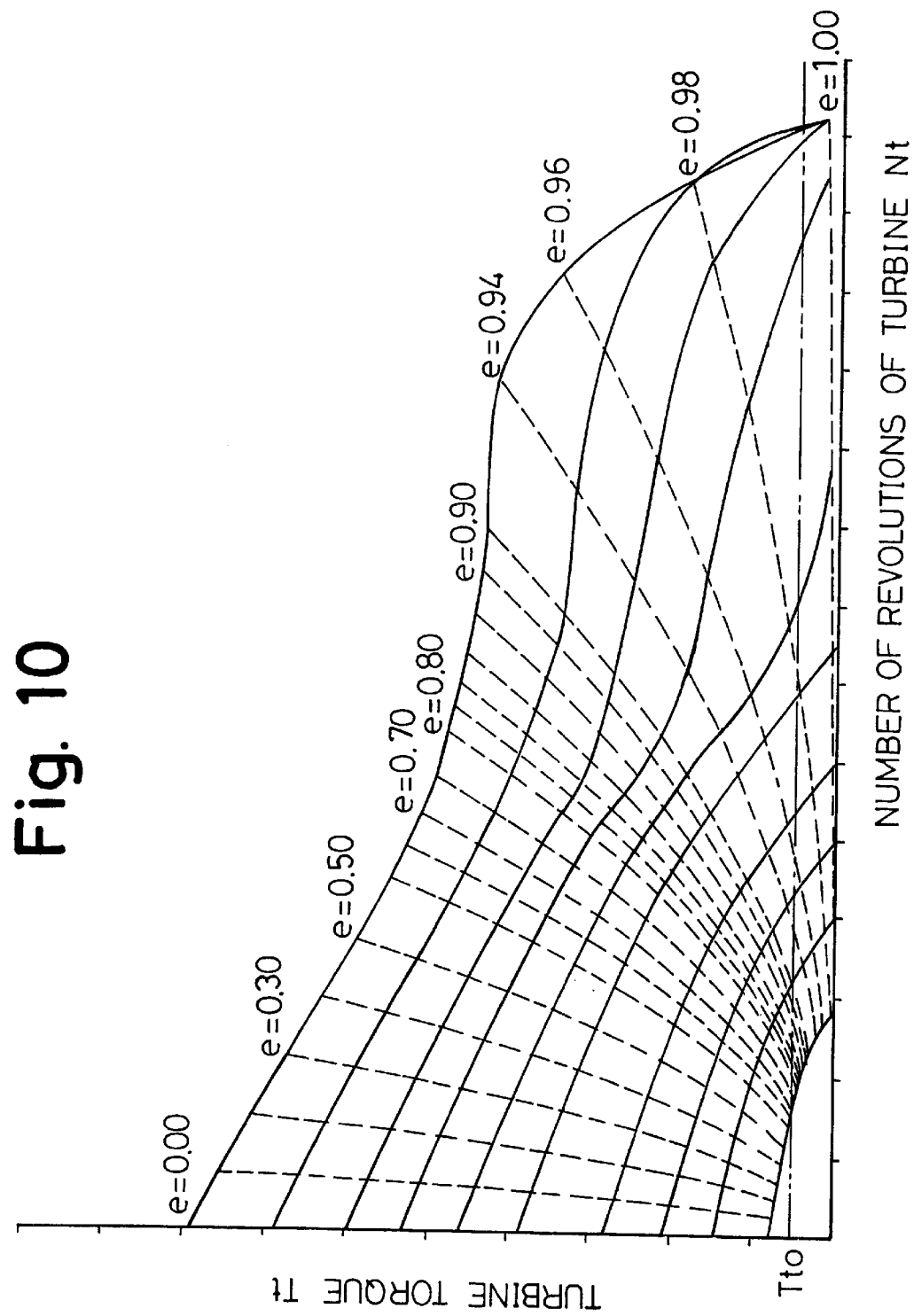
FIG. 10 is a graph of performance characteristic curves of the torque converter shown in FIG. 3.

The electronic control unit ECU also judges in Step 305 whether or not the engine torque found from the engine speed and the throttle opening angle is within a control implementing range under a two-dot chain line in FIG. 8. When it is determined to be "YES" in Step 305, the electronic control unit ECU advances to Steps 306, 307 and 308. When the result of the determination in Step 305 is "NO', the routine jumps to Step 309. In Step 306, the electronic control unit ECU reads the car speed obtained from the signal from the output shaft speed sensor S3 as well as the actual engine speed Ne obtained from the signal from the engine speed sensor S1. The electronic control unit ECU then computes in Step 307 the number of revolutions of the turbine Nt of the torque converter T (the number of revolutions of the input shaft of the automatic transmission) from the car speed read in Step 306 and the shift gear ratio before the up-shift (the gear ratio of the second speed), computes a torque converter speed ratio e which is a small range upper limit value Tto of the turbine torque Tt from the number of revolutions of the turbine Nt obtained by the above computation with reference to the torque converter performance characteristic map in FIG. 10, and computes a power-off engine speed NeO (=Nt/e) necessary for outputting the small range upper limit value Tto of the turbine torque Tt from the number of revolutions Nt of the turbine and the torque converter speed ratio e obtained by the above computations.

The electronic control unit ECU also determines in Step 308 whether or not the actual engine speed Ne is equal to or greater than the power-off engine speed NeO. When it is determined that the actual engine speed Ne is equal to or greater than the power-off engine speed NeO (i.e., the result of Step 308 is "YES"), the electronic control unit ECU advances to Step 309. When it is determined that the actual engine speed Ne is not equal to or greater than the power-off engine speed NeO (i.e., the result of Step 308 is "NO"), the routine jumps to Step 310.

In Step 309, the electronic control unit ECU determines whether an elapsed time t is equal to or greater than the timing time t1 in Step 309. When it is determined to be "NO", the electronic control unit ECU returns to Step 303 and when the elapsed time t is determined to be equal to or greater than the timing time t1, the routine advances to Steps 310, 311 and 312.

In Step 310, the electronic control unit ECU outputs a signal for turning on the solenoid valve SOL3 and then determines in Step 311 whether the elapsed time is equal to or greater than the maximum value te of the timing time. When it is determined to be "NO" in Step 311, the electronic control unit ECU repeats Step 311 and when the determination in Step 311 is "YES", advances to Step 312. The electronic control unit ECU then outputs a signal for turning off the solenoid valve SOL3 in Step 312.

Accordingly, when the engine torque is not within the control implementing range in shifting up from the second speed to the third speed, the electronic control unit ECU executes Steps 301, 302, 303, 304, 305, 309, 310, 311 and 312. When the timing time t1 described above is determined to be the minimum value t0 for example in Step 304, the electronic control unit ECU executes Step 310 at the point in time when t0 has elapsed after the output of the shift signal to turn on the solenoid valve SOL3 and to apply pilot hydraulic pressure to the pilot oil chamber 181 of the 2-3 shift timing valve 180. Then, when the hydraulic pressure within the hydraulic clutch C2 rises almost to P1, the 2-3 shift timing valve 180 is switched from the non-operative state to the operative state and from the slow drain state to the quick drain state so that the characteristic curve approximated by the broken line in FIG. 6 is achieved. The electronic control unit ECU executes Step 312 at the point in time when the elapsed time t has reached te (the maximum value of the timing time) to turn off the solenoid valve SOL3. When the timing time t1 described above is determined to be the maximum value te for example in Step 304, the electronic control unit ECU executes Steps 310, 311 and 312 in the same time at the point in time when the value te has elapsed after the output of the shift signal so as not to turn on the solenoid valve SOL3 substantially. Then, when the hydraulic pressure within the hydraulic clutch C2 rises to P2, the 2-3 shift timing valve 180 is switched from the non-operative state to the operative state and from the slow drain state to the quick drain state to thereby achieve a characteristic curve approximated by the solid line in FIG. 6.

When the engine torque is within the control implementing range in shifting up from the second speed to the third speed, the electronic control unit ECU executes also Steps 306, 307 and 308. Although the above-mentioned operation is performed when the actual engine speed Ne is equal to or greater than the power-off engine speed NeO at this time, the electronic control unit ECU executes Step 310 right after the execution of Step 308 to turn on the solenoid valve SOL3 when the actual engine speed Ne is below the power-off engine speed NeO. Then, a characteristic approximated by a characteristic curve (not shown) obtained by displacing the broken line in FIG. 6 in the horizontal direction may be achieved. Although the hydraulic pressure within the hydraulic brake B1 drops sharply right after the execution of Step 308 at this time, no engine blow occurs because the engine torque is small.

Because the present embodiment has been arranged so as to be able to obtain auxiliarily the operation of switching from the slow drain state to the quick drain state at the optimum switching timing corresponding to the turbine torque Tt which changes or varies less than the engine torque due to various conditions by executing Steps 306, 307 and 308 in FIG. 7 in the range where the engine torque changes or varies to the not negligible degree, i.e., in the control implementing range, upon switching from the slow drain state to the quick drain state at the optimum switching timing corresponding basically to the engine torque as described above, the state is switched from the slow drain state to the quick drain state at the optimum switching timing which causes less shift shock even in the range where the engine torque changes or varies to a not negligible degree. Accordingly, the present invention can reliably prevent shift shock and allows the driver to obtain the optimum shift feeling without being influenced by individual variations of the engine performance and its elapsed change, by ON/OFF condition of an air-conditioner and by changes in use conditions such as those in running up/down a slope.

Further, because steps similar to Steps 306, 307 and 308 in FIG. 7 (i.e., control implementing range discriminating means, computing means and auxiliary operation control means) in the present invention may be used even if the engine E is changed to another type as long as the torque converter T and the automatic transmission M are the same, the period of time for developing the system for controlling the automatic transmission (shift control unit) may be shortened. It is noted that the control implementing range shown in FIG. 8 has been set and Step 305 in FIG. 7 has been set and implemented in the present invention, it is possible to practice the invention by setting the whole range shown in FIG. 8 as the control implementing range and by eliminating Step 305 in FIG. 7.

Figure 9:
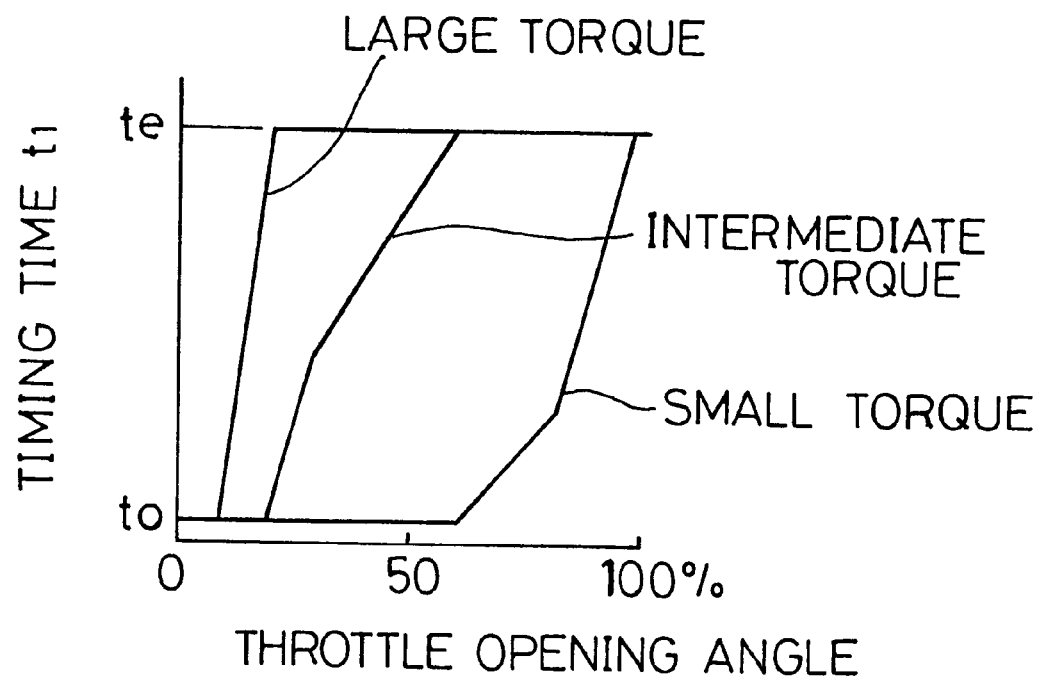
FIG. 9 is a graph showing a timing time map example stored in the electronic control unit in FIG. 3.
Figure 11:
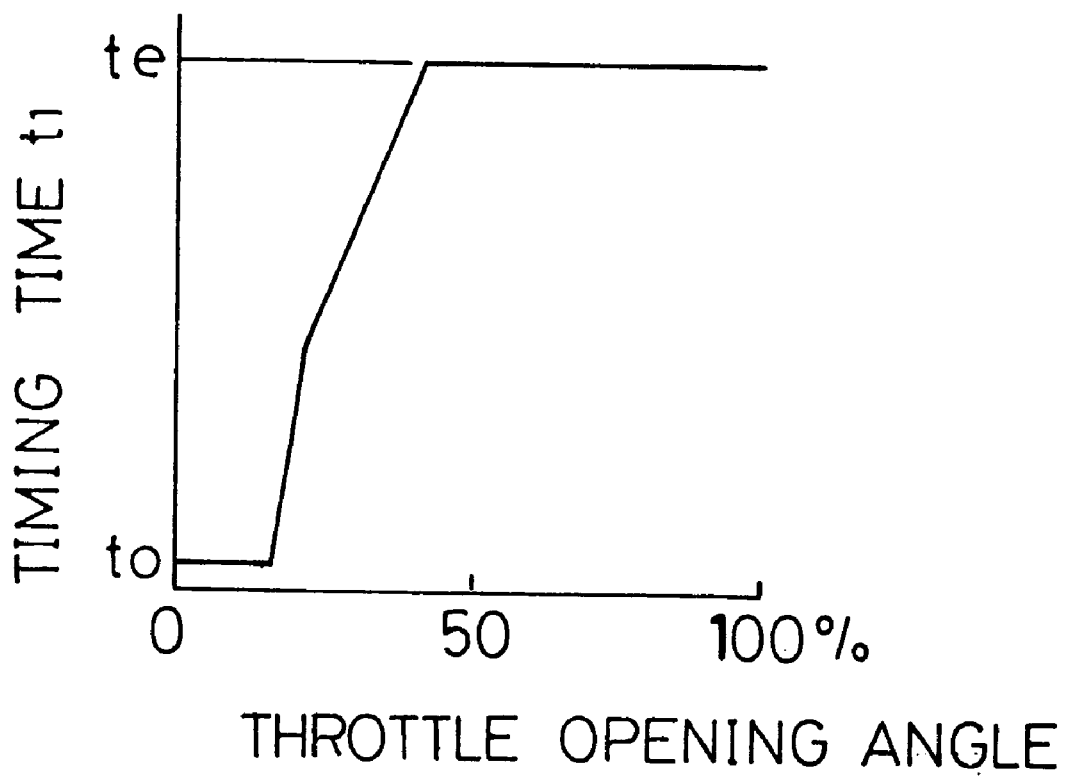
FIG. 11 is a graph showing a variation on the timing time map.

Further, although the timing time t1 has been decided by making reference to the timing time map in FIG. 9 after discriminating whether the engine torque is large, intermediate or small by making reference to the engine torque map in FIG. 8, it is also possible to practice the invention by eliminating Step 303 in FIG. 7 and by deciding the timing time t1 by making reference to the timing time map in FIG. 11 in Step 304 because the magnitude of the engine torque may be replaced approximately with the degree of the throttle opening angle.

Figure 12:
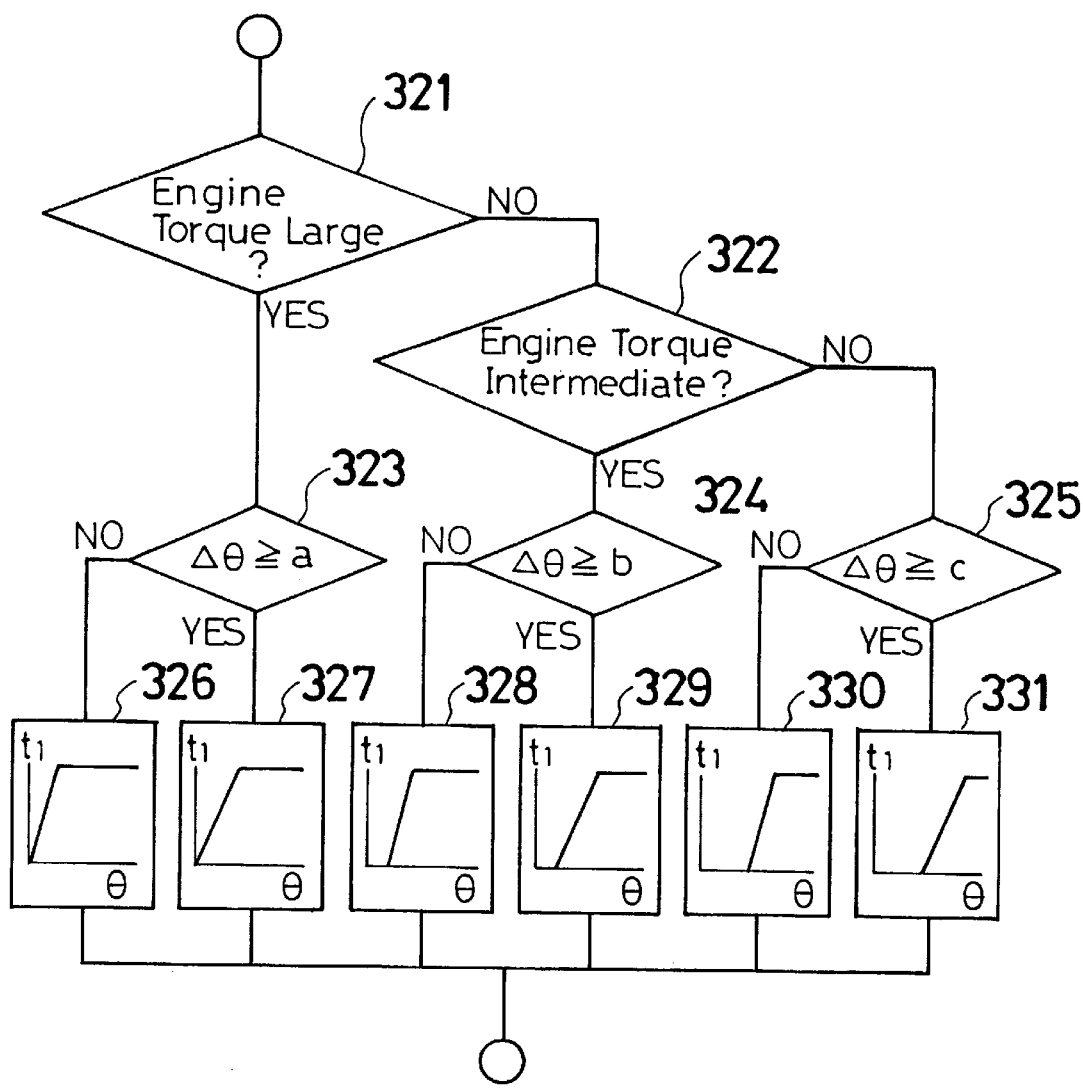
FIG. 12 is a flowchart partially showing a variation of the program executed by the electronic control unit in FIG. 3.

It is also possible to practice the invention by executing Steps 321 through 331 in FIG. 12 instead of Steps 303 and 304 in FIG. 7. The engine torque is determined to be large, intermediate or small in Steps 321 and 322 in FIG. 12 by making reference to the engine torque map in FIG. 8. In Steps 323–325, it is determined whether or not Δθ (returned degree of throttle or throttle return speed) is equal or greater than respective preset values a, b and c. The timing time t1 is decided from the throttle opening angle θ with reference to each timing time map in Steps 326–331.

Figure 13:
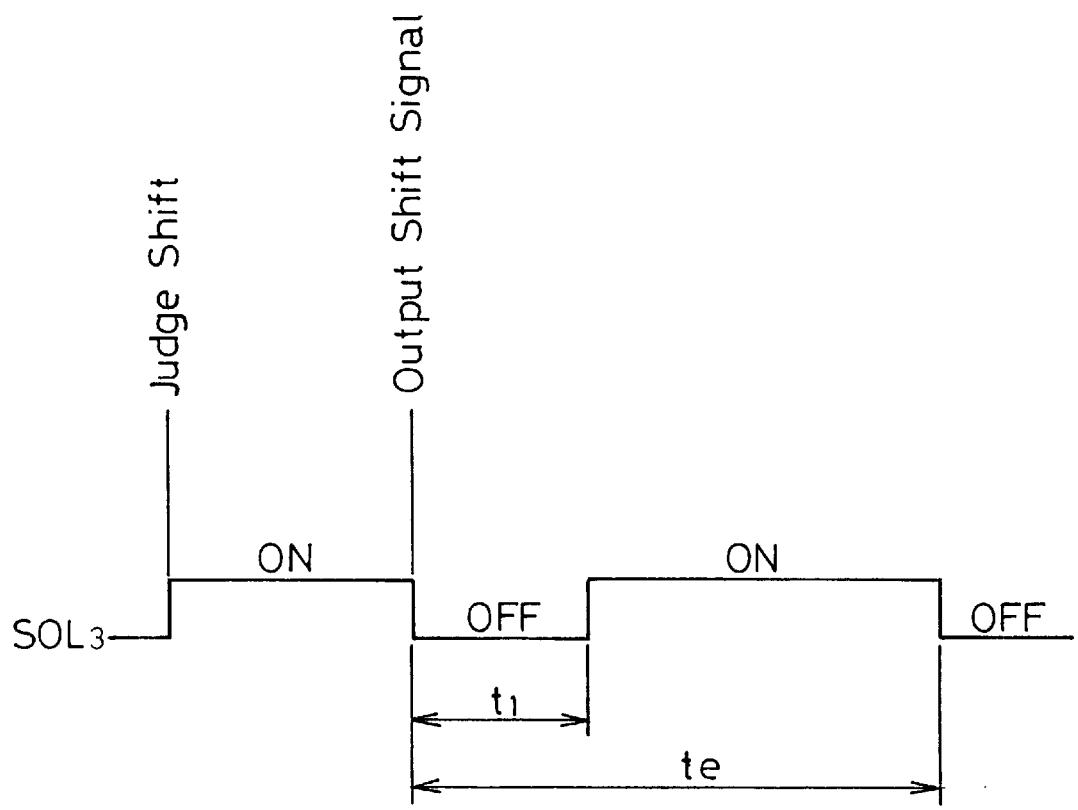
FIG. 13 is a chart showing ON/OFF operations of a solenoid valve SOL3 in shifting up from Second to Third.

Although the embodiment of the present invention described above has been arranged such that the solenoid valve SOL3 which has been turned off is turned on at the point in time when t1 has elapsed after the output of the shift signal in shifting up from the second speed to the third speed, it is also possible to practice the invention by making a shift judgment when it is detected that the range is in the second speed operating range on the side close to the third speed operating range from the throttle opening angle and the car speed with reference to the shift map before the shift signal is outputted as shown in FIG. 13 to turn on the solenoid valve SOL3 and to turn off the solenoid valves SOL1, SOL2 at the point in time when the shift signal is outputted similar to the above-mentioned embodiment when build-up of the pilot hydraulic pressure obtained by turning on the solenoid valve SOL3 is bad.

According to the present invention described above, when the shift lever 11 is shifted from the D-position to the L-position and the manual valve 10 is shifted from the D-range to the L-range with the vehicle running at a high speed equal to or greater than a preset car speed in the fourth speed shift stage in the D-position, the electronic control unit ECU emits a third speed shift signal and the low inhibit valve 170 disconnects the lower pilot oil chamber 92 of the 2-3 shift valve 90 from the L-range circuit 205 and connects it continuously to the reservoir. Accordingly, although the line pressure supplying circuit 201 is connected to the L-range circuit 205 at the manual valve 10, the 2-3 shift valve 90 is kept in the non-operative state, i.e., in the high speed operation mode which allows the third or fourth speed shift stage by supplying oil pressure to the hydraulic clutch C2 from the D-range circuit 203, and is not shifted down suddenly to the second speed shift stage even though it is shifted down from the fourth speed shift stage to the third speed shift stage. This thus reliably prevents the abrupt deceleration shock and an over-run of the engine. When the shift lever 11 is shifted from the D-position to the L-position and the manual valve 10 is shifted from the D-range to the L-range in a vehicle running at a high speed equal to or greater than the preset car speed in the third speed shift stage in the D-position, the electronic control unit ECU continues to emit a third speed shift signal and holds the third speed shift stage.

When the shift lever 11 is shifted from the D-position to the L-position and the manual valve 10 is shifted from the D-range to the L-range in a vehicle running at a speed less than the preset car speed in the fourth or third speed shift stage in the D-position, the electronic control unit ECU emits a second speed command signal and the low inhibit valve 170 is switched to the non-operative state in which the lower pilot oil chamber 92 of the 2-3 shift valve 90 communicates with the L-range circuit 205. Accordingly, as the line pressure supplying circuit 201 is connected to the L-range circuit 205 by the manual valve 10 at this time, the 2-3 shift valve 90 is switched to the operative state, i.e., in the low speed operation mode which allows the first or second speed shift stage by discharging oil pressure from the hydraulic clutch C2, and is shifted down from the fourth or third speed shift stage to the second speed shift stage. Accordingly, because the car speed is not a high speed at this time, no abrupt deceleration shock nor over-run of the engine occurs even when the speed is shifted down from the fourth or third speed shift stage to the second speed shift stage. This allows the driver to obtain adequate engine brake and driving force.

The present invention as described above is constructed such that the solenoid valves SOL1 and SOL2 are both turned off and the solenoid valve SOL3 is turned on, and the low inhibit valve 170 is put into the state in which the lower pilot oil chamber 92 of the 2-3 shift valve 90 is disconnected from the L-range circuit 205 and communicates with the reservoir, i.e., in the operative state, with the vehicle running at the fourth speed shift stage in the D-position as is apparent from the (D4) situation described above. Due to that, even when the shift lever 11 is shifted from the D-position to the L-position and the manual valve 10 is shifted from the D-range to the L-range in a fail state in which the position sensor S4 cannot detect the shift to the L-position, the electronic control unit ECU continuously emits a fourth speed shift signal to turn off the both solenoid valves SOL1 and SOL2. In this state, although the line pressure supplying circuit 201 communicates with the L-range circuit 205 by the manual valve 10, the supply of oil pressure from the line pressure supplying circuit 201 to the lower pilot oil chamber 92 of the 2-3 shift valve 90 is disconnected by the low inhibit valve 170 in the operative state and the 2-3 shift valve 90 is maintained in the non-operative state. Thus, although the speed is shifted down to the third speed shift stage in the gear train, it is possible to prevent abrupt engine over-run.

It is noted that when the solenoid valve SOL3 is turned off and the low inhibit valve 170 is put into the state in which the lower pilot oil chamber 92 of the 2-3 shift valve 90 communicates with the L-range circuit 205, i.e., in the non-operative state, when the vehicle is running in the fourth speed shift stage in the D-position, oil pressure is supplied to the lower pilot oil chamber 92 of the 2-3 shift valve 90 from the line pressure supplying circuit 201 as the line pressure supplying circuit 201 communicates with the L-range circuit 205 at the manual valve 10 and the 2-3 shift valve 90 is switched to the operative state, thus forming a circuit equivalent to the L–1 range circuit when the shift lever 11 is shifted from the D-position to the L-position when the position sensor S4 is in the fail state as described above. Then, the gear train shown in FIG. 1 is switched from the gear train of the fourth speed shift stage to the gear train of the first speed shift stage, causing an abrupt down-shift.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A shift control unit of an automatic transmission, attached to the automatic transmission connected to an engine through an intermediary of a torque converter, having a function of switching engaging hydraulic pressure of a releasing side frictional engaging element from a slow drain state to a quick drain state at the time of up-shift attained by releasing one frictional engaging element and by engaging another frictional engaging element based on an output of a shift signal, and comprising:

engine torque detecting means for detecting engine torque;

timing time deciding means for deciding, when said shift signal is outputted, a timing time from the output of said shift signal to the start of said quick drain state non-stepwise based on a detection signal from said engine torque detecting means; and operation control means for putting the state of said element into said slow drain state during the timing time decided by said timing time deciding means and putting into said quick drain state when the timing time has elapsed;

wherein the shift control unit of the automatic transmission further comprising:

computing means for computing power-off engine speed necessary for outputting a small range upper limit value of a turbine torque from a number of revolutions of a turbine of said torque converter found from car speed and a shift gear ratio before up-shift and from the performance characteristic of said torque converter; and auxiliary operation control means for comparing said power-off engine speed computed by said computing means and actual engine speed and to execute said operation control means when the actual engine speed is equal to or greater than said power-off engine speed and to put into said quick drain state immediately without executing said operation control means when the actual engine speed is below said power-off engine speed.

* * * * *